No. 858,797. PATENTED JULY 2, 1907.
W. E. EBERT.
SYSTEM OF ELECTRIC CONTROL.
APPLICATION FILED DEC. 1, 1905.

5 SHEETS—SHEET 1.

WITNESSES:

INVENTOR
W. E. Ebert.
BY
ATTORNEYS.

No. 858,797. PATENTED JULY 2, 1907.
W. E. EBERT.
SYSTEM OF ELECTRIC CONTROL.
APPLICATION FILED DEC. 1, 1905.

WITNESSES:
Fred Henke.
W. A. Alexander

INVENTOR
W. E. Ebert.
BY
Fowler & Bryson
ATTORNEYS.

UNITED STATES PATENT OFFICE.

WOLFGANG E. EBERT, OF ST. LOUIS, MISSOURI.

SYSTEM OF ELECTRIC CONTROL.

No. 858,797.  Specification of Letters Patent.  Patented July 2, 1907.

Application filed December 1, 1905. Serial No. 289,757.

*To all whom it may concern:*

Be it known that I, WOLFGANG E. EBERT, a subject of the German Emperor, residing at the city of St. Louis, State of Missouri, have invented a certain new and useful System of Electric Control, of which the following is such a full, clear, and exact description as will enable any one skilled in the art to which it appertains to make and use the same, reference being had to the accompanying drawings, forming part of this specification.

This invention relates to a system of controlling electrical devices whereby a comparatively large number of such devices may be controlled from a distant point by a comparatively small number of mains, or line wires.

In the carrying out of my invention I employ a number of mains, or line wires, which lead from a controlling point to what I denominate a receiving unit, or distributing point. The receiving units, or distributing points, are preferably arranged in juxtaposition and in proximity to the apparatus to be controlled. From the receiving units, or distributing points, lead conductors to the apparatus to be controlled. The apparatus to be controlled may be any electrical apparatus which may be controlled by an electric circuit, but, for the sake of simplicity, I have shown incandescent lamps as the electrical apparatus to be controlled. I do not wish, however, to limit my invention to controlling incandescent electric lamps, as any electrical apparatus may be controlled by my system. There is one direct main leading to each receiving unit, or distributing point, and one return main for all the receiving units, returning the current to the source of energy. Each direct main leading from the controlling point to its receiving unit, or distributing point serves two purposes:—First, it controls all the receiving units. Secondly, each main provides a means for conducting the current from the controlling point to the electrical apparatus to be controlled by way of the receiving units. It is obvious, therefore, that for N mains there are N positions of the different receiving units and that N—1 lamps may be controlled for each position of the receiving units and N (N—1) lamps may be controlled by N mains.

Figure 1:
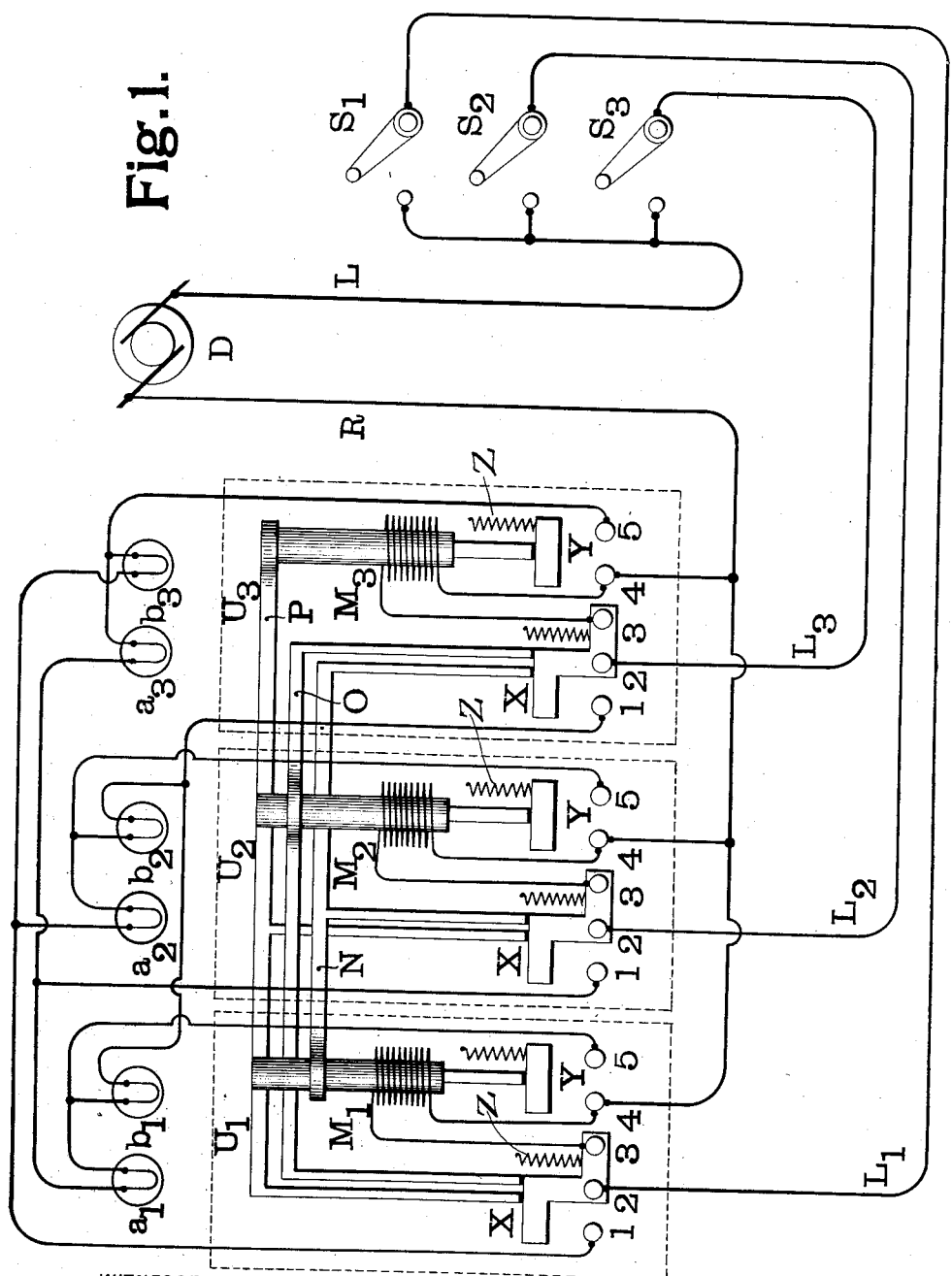
Figure 2:
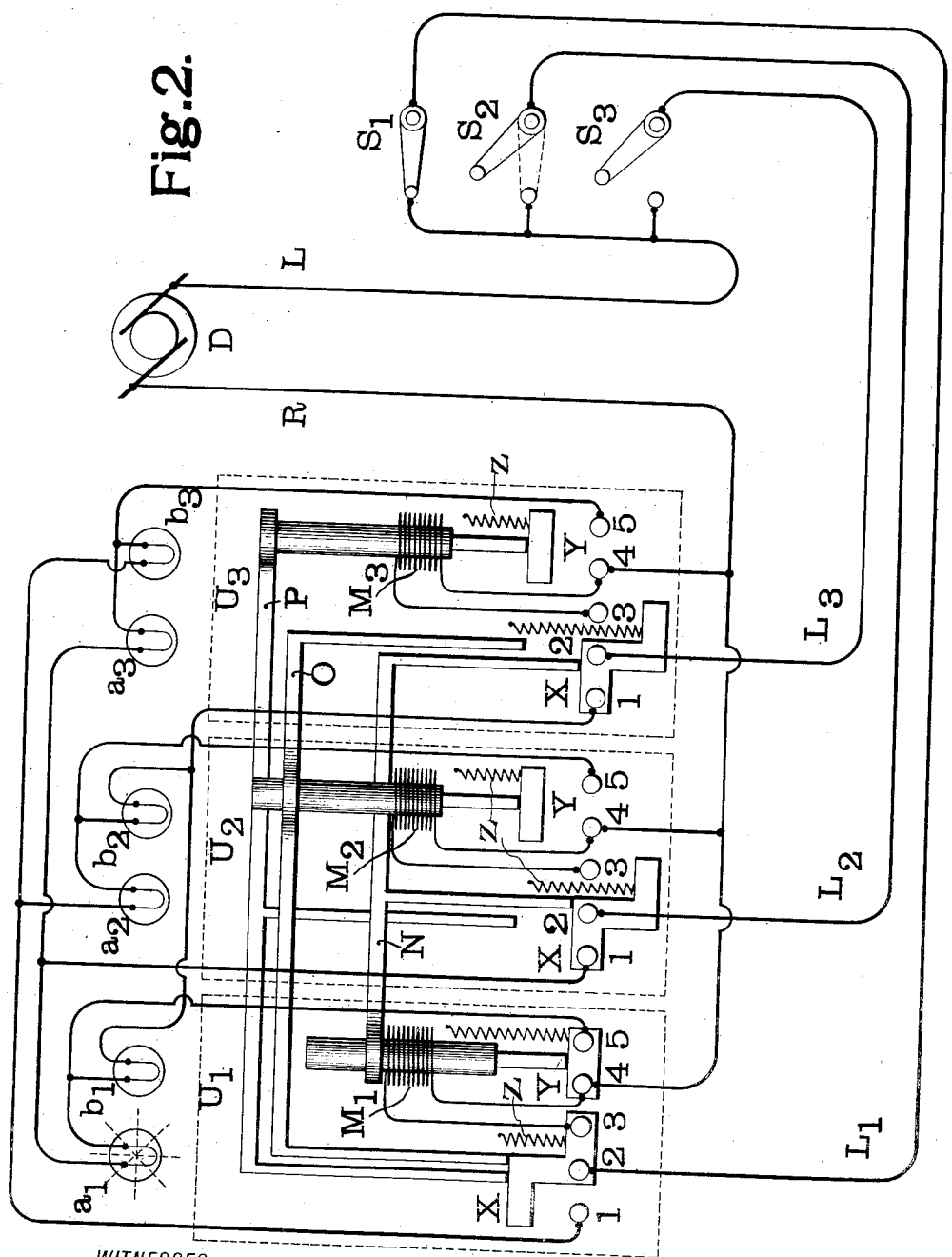
Figure 3:
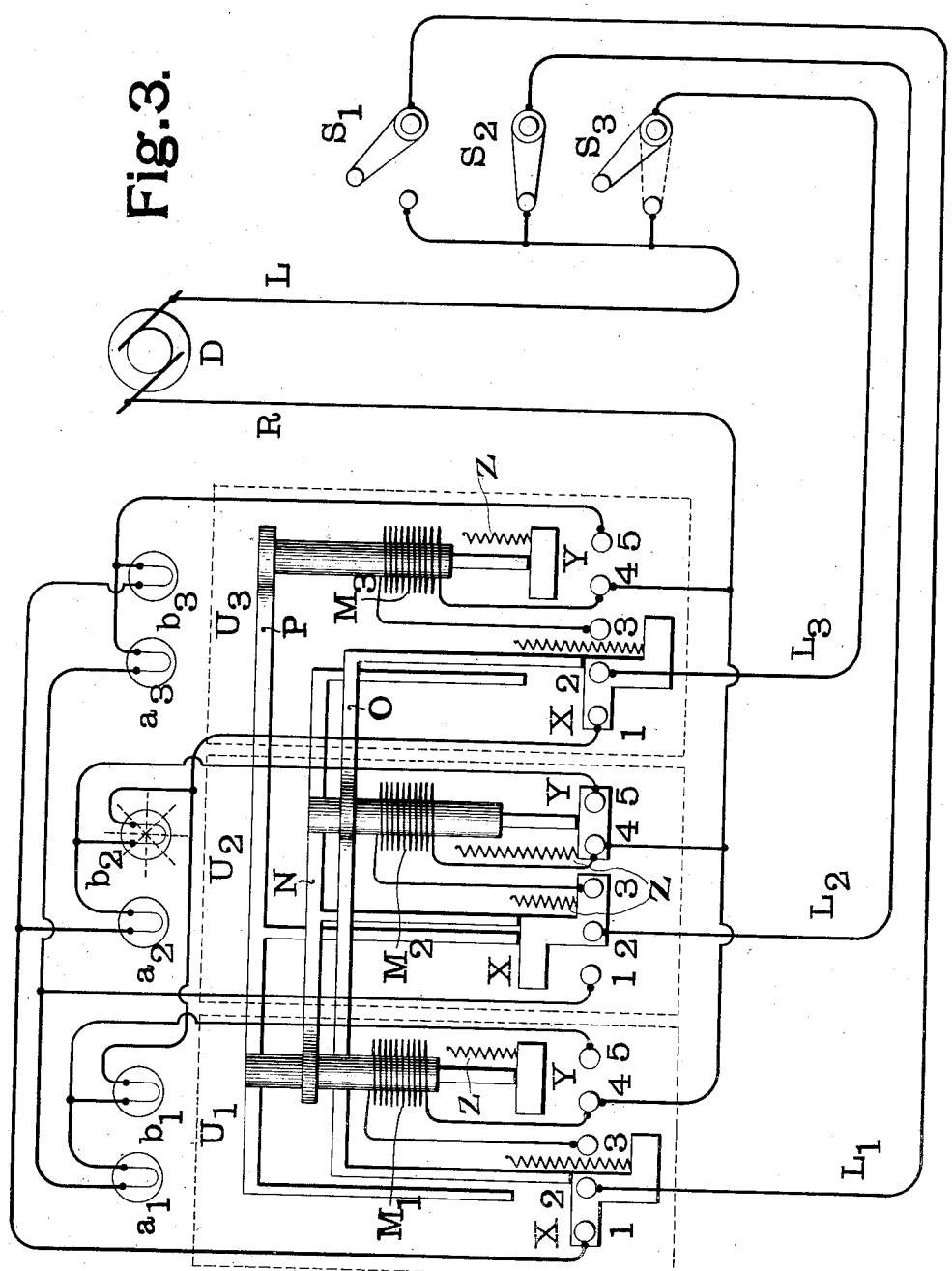
Figure 4:
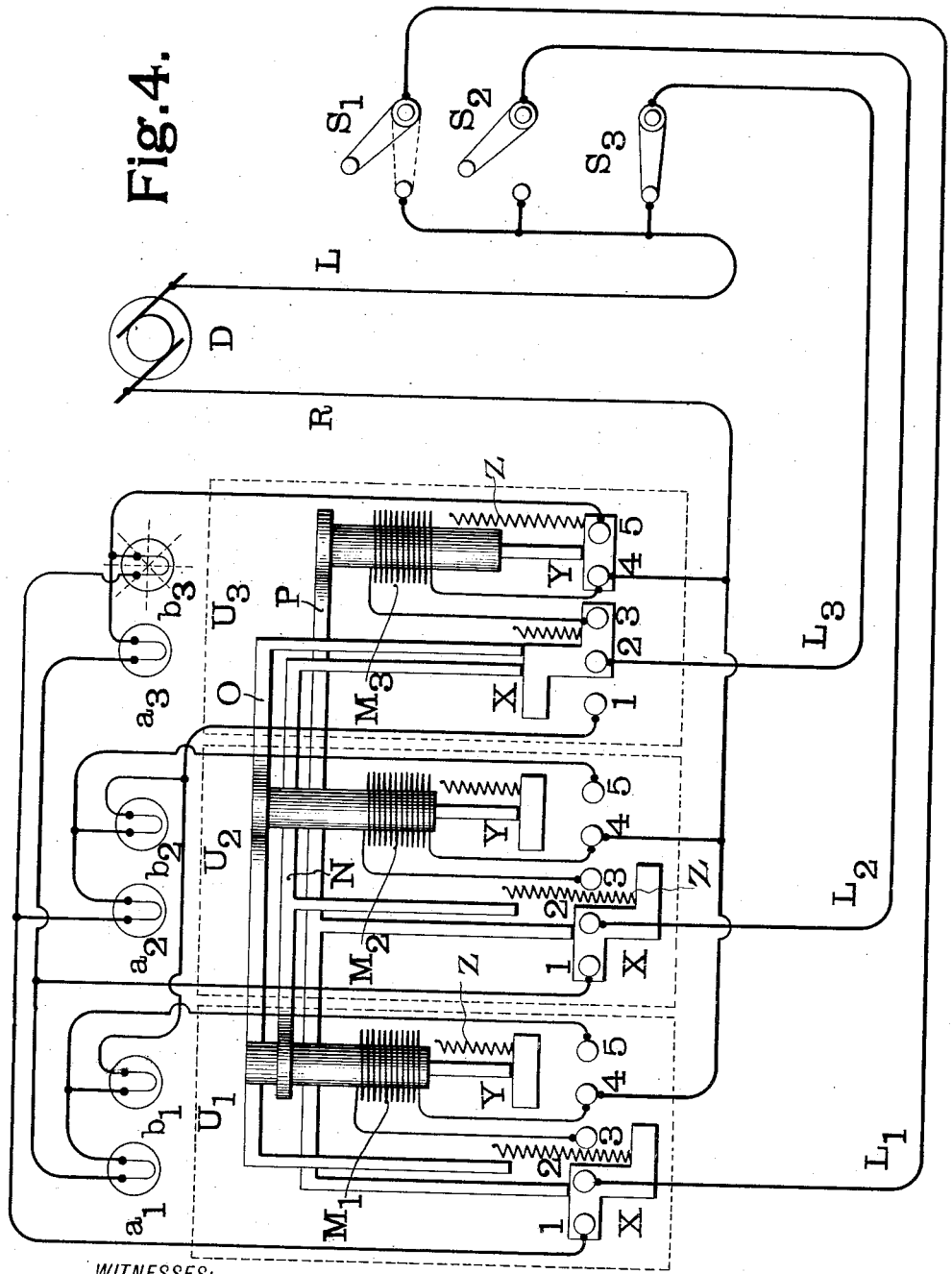
Figure 5:
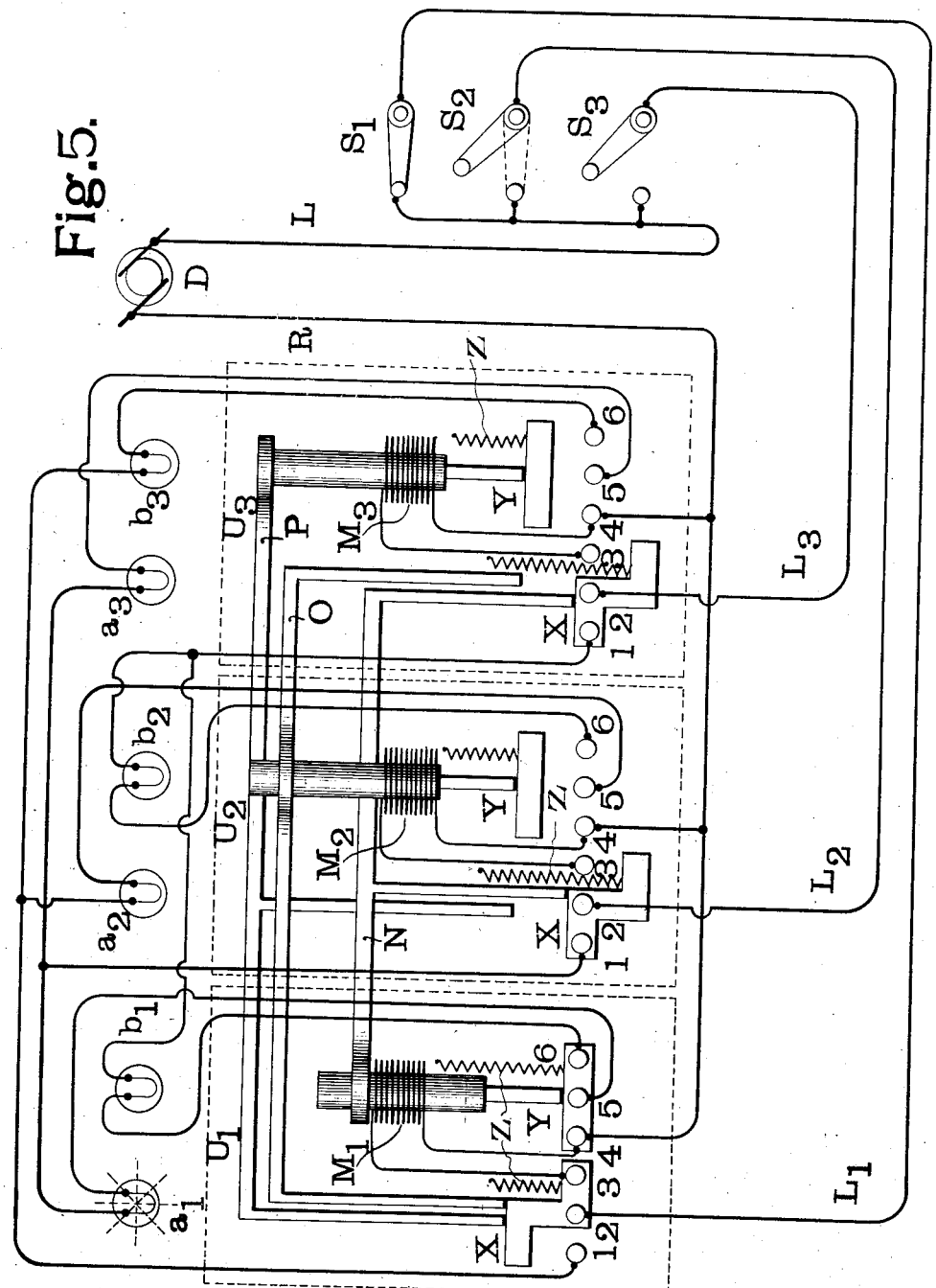

The way of accomplishing the foregoing may be explained by the accompanying drawings, in which Figure 1 is a diagrammatic view showing six incandescent lamps to be controlled by three direct mains and three receiving units, the parts being shown in normal position. Fig. 2 is a similar view showing the first main on closed circuit in full lines and one position of the receiving units in consequence thereof. Fig. 3 is a similar view showing the second main on closed circuit in full lines and the second position of the receiving units in consequence thereof. Fig. 4 is a similar view showing the third main on closed circuit in full lines and the third and last position of the receiving units in consequence thereof. Fig. 5 is a diagrammatic view similar to Fig. 2 illustrating a modification.

In the drawings like characters of reference indicate similar parts.

D represents any suitable source of energy, showing diagrammatically, for the purpose of illustration merely, an alternating or direct current dynamo for instance; but it will be understood that any electrical source of energy may be used, such as a primary battery, a secondary battery, etc. From the source of energy D leads a conductor L to the terminals of the three switches $S_1$, $S_2$ and $S_3$. From these switches lead three mains or line wires $L_1$, $L_2$, and $L_3$ to a distant point. The line or main $L_1$ leads to the receiving unit or distributing point $U_1$, and the lines or mains $L_2$ and $L_3$ to the receiving units or distributing points $U_2$ and $U_3$ respectively. The switches $S_1$, $S_2$, $S_3$ are located at the controlling point from which it is desired to control the electrical devices situated at a distance. The receiving units or distributing points in the present instance are three in number and each provided with a series of contacts 1, 2, 3, 4, 5. The contacts 1 and 5 of each of the receiving units are electrically connected to the electrical devices to be controlled, in the present instance incandescent electric lamps $a_1$, $b_1$; $a_2$, $b_2$; and $a_3$, $b_3$, as illustrated in the drawings. The contacts 2 of the receiving units $U_1$, $U_2$ and $U_3$ are connected respectively to the mains or line wires $L_1$, $L_2$ and $L_3$.

At each of the receiving units is located an electromagnetic device $M_1$, $M_2$ and $M_3$ respectively, preferably a solenoid. The contacts 3 and 4 of each of the receiving units are connected to the terminals of the coils of the respective solenoids. Co-operating with the contacts 1, 2 and 3 of each of the receiving units is a double L-shaped circuit changer X, the normal position of which is shown in Fig. 1. This normally completes the circuit between the contacts 2 and 3 of each of the receiving units. Co-operating with the contacts 4 and 5 of each of the receiving units is a circuit maker and breaker Y, which is normally out of electrical connection with said contacts. The circuit changers X and Y are returned to their normal position by means of springs Z. Each of the contacts 4 of the receiving units is connected to a common return wire R, by which the current is returned and the circuit completed to the source of energy D. The cores of the solenoids operate directly upon the circuit maker and breaker Y of the different receiving units respectively, which circuit makers and breakers Y are shown as carried by and insulated from an extension piece axially extending from the forward ends of the cores of the solenoids. Extending from and rigidly attached to the core of the solenoid $M_1$ is a transverse member N having two forwardly extending limbs, one of which bears upon but is insulated from the double L-shaped circuit changer X of the receiving unit $U_2$, and the other of which bears upon but is insulated from the double L-shaped circuit changer X of the receiving unit $U_3$. It will thus be apparent that when the solenoid $M_1$ is energized, it will not only operate the circuit maker and breaker Y of the receiving unit $U_1$, but will also operate the circuit changers X of the receiving units $U_2$ and $U_3$. Similarly, the core of the solenoid $M_2$ has extending from it laterally and rigidly attached thereto a member O having two forward extensions which bear upon but are insulated from the double L-shaped circuit changers X of the receiving units $U_1$ and $U_3$, so that when the solenoid $M_2$ is energized, it will not only operate the circuit maker and breaker Y of the receiving unit $U_2$ but will also operate the double L-shaped circuit changer X of the receiving units $U_1$ and $U_3$. So too, the core of the solenoid $M_3$ has a similarly laterally extending member P having two forward extensions bearing upon but insulated from the double L-shaped circuit changers X of the receiving units $U_1$ and $U_2$, so that when the solenoid $M_3$ is energized it will operate the circuit maker and breaker Y as well as the double L-shaped circuit changers X of the receiving units $U_1$ and $U_2$. The arrangement of the solenoids and of the laterally extending members is represented diagrammatically merely.

In the carrying out of my invention, to control any electrical device, one of the switches $S_1$, $S_2$ or $S_3$ is closed, depending upon which one of the electrical devices is to be controlled. For instance, if it is desired to control one of the electrical devices or lamps $a_1$, $b_1$ of the receiving unit $U_1$, the switch $S_1$ is closed. A current from the source of energy D then traverses the conductor L, passing over the switch $S_1$ to the main or line wire $L_1$ to the contact 2 of the receiving unit $U_1$ (see Fig. 1), thence by way of the forward limb of the double L-shaped circuit changer X to the contact 3 and then by way of the solenoid $M_1$ to the contact 4 and is returned to the source of energy by the return wire R. This energizes the solenoid $M_1$ as shown in Fig. 2 and causes the core of such solenoid and the member N connected therewith to be forced downwardly and to operate the double L-shaped circuit changer X of the receiving units $U_2$ and $U_3$, establishing electrical connection between the contacts 1 and 2 of such receiving units, and opening the circuit of the solenoids $M_2$ and $M_3$ at the contacts 3. To now put either of the electrical devices $a_1$ or $b_1$ in circuit, it is but necessary to close one of the other switches $S_2$ or $S_3$ after the switch $S_1$ is closed. In Fig. 2 I have shown the switch $S_2$ closed by dotted lines. The current now passes also by way of the switch $S_2$ over the main or line wire $L_2$ to the contact 2 of the receiving unit $U_2$, and then over the double L-shaped circuit changer X to the contact 1 and then passes to the lamp $a_1$ and to the contact 5 of the receiving unit $U_1$, over the circuit maker and breaker Y of such receiving unit to the contact 4 thereof and back over the wire R to the source of energy. This causes the lamp $a_1$ to be controlled or lighted as shown by dotted lines in Fig. 2. If switch $S_3$ instead of switch $S_2$ had been closed, after the switch $S_1$ was closed, it would have lighted the lamp $b_1$.

If it is desired to control one of the electrical devices or lamps of the receiving unit $U_2$, it is but necessary in the first instance to complete the circuit of the main or line wire $L_2$ leading to the receiving unit $U_2$ by closing the switch $S_2$ as shown in Fig. 3. The current then passes from the source of energy over the line wire $L_2$ through the solenoid $M_2$ by way of the double L-shaped circuit changer X of the receiving unit $U_2$ (see normal position of the parts as shown in Fig. 1), to the contact 4, then back by the return main or wire R to the source of energy, energizing the solenoid $M_2$ and causing its core and lateral member O connected therewith to be drawn down so as to operate the double L-shaped circuit changer X of the receiving units $U_1$ and $U_3$ at the same time that the solenoid $M_2$ operates its circuit maker and breaker Y as shown in Fig. 3. If the switch $S_3$ as shown by the dotted lines in Fig. 3 is now closed and the switch $S_2$ is still left on closed circuit, the electrical device or lamp $b_2$ will be operated as shown by dotted lines in Fig. 3. The current then also passes over the line $L_3$ by way of the switch $S_3$ over the double L-shaped circuit changer X of the receiving unit $U_3$ to the lamp $b_2$ and then returns by way of the circuit maker and breaker Y of the receiving unit $U_2$ to the generator by the return wire R. If, instead of closing the switch $S_3$ after the switch $S_2$, the switch $S_1$ had been closed, the lamp $a_2$ would have been lighted instead of the lamp $b_2$.

In Fig. 4, I have shown the third and last position of the receiving units caused by first closing the switch $S_3$ to control one of the electrical devices $a_3$ or $b_3$ of the receiving unit $U_3$. Here the current from the source of energy energizes the solenoid $M_3$ in a similar manner as before explained with reference to the other receiving units, which causes the core of such receiving unit and the lateral piece P thereof to be drawn down, operating not only the circuit maker and breaker Y of that receiving unit but also the double L-shaped circuit changer X of the receiving units $U_1$ and $U_2$. After this, should the switch $S_3$ be closed as shown by dotted lines in Fig. 4, the electrical device or lamp $b_3$ will be energized as shown by dotted lines in Fig. 4. The current also passes over the switch $S_1$ and line wire $L_1$ by way of the double L-shaped circuit changer X of the receiving unit $U_1$ to the lamp $b_3$ and then to the contact 5 and circuit maker and breaker Y of the receiving unit $U_3$ to the return main or wire R. If the switch $S_2$ had been closed after the switch $S_3$, instead of the switch $S_1$, the lamp $a_3$ would have been lighted instead of the lamp $b_3$. From the foregoing it will be seen that to light any lamp requires the closing of two switches and that a small interval of time must elapse between the closing of the first and second switches.

Having reference now more particularly to Fig. 2 it will be seen from the arrangement of the circuits that the circuit of the lamp $a_1$ is not only closed when the switches $S_1$ and $S_2$ are closed but that the circuits of the other lamps are closed and that such other lamps are as a series in multiple with the circuit of the lamp $a_1$, and that in Figs. 3 and 4 the same thing occurs, that is, when any given lamp is in circuit the other lamps are as a series in multiple with such other lamp. This is because the other lamps are connected in series across the circuit of the lamp $a_1$, in Fig. 2 for instance, as the contact 5 of the receiving unit $U_1$ (as well as of all the receiving units) is common to and electrically connected with the terminals of both lamps of its group of lamps or electrical devices. For all practical purposes the low voltage on and caused by the other lamps being in series would be negligible as it would make so little light as to be unnoticeable. In some forms of apparatus one fifth of the normal voltage would have practically no effect. In case some apparatus is to be used which this low voltage might affect, I have devised means to obviate the remaining lamps or electrical devices being put in circuit at all. In Fig. 5 I employ an additional contact 6 which is controlled by the circuit maker and breaker Y of the receiving units so that the lamps of each group have each a separate contact 5 or 6, as the case may be, controlled by the circuit makers and breakers Y. Instead therefore of connecting the second lamp or electrical device $b_1$, $b_2$, $b_3$ in the same circuit with the first lamp or electrical device $a_1$, $a_2$, $a_3$, I connect the terminal of the lamp which heretofore connected to the circuit of its companion electrical device or lamp to the separate contact 6. This modification does not necessitate any more wires leading from the controlling point to the receiving units, but requires more wires leading from the receiving units to the electrical devices or lamps to be controlled.

From the foregoing it will be seen that by three direct mains or line wires six lamps may be controlled. It will be obvious furthermore that my system is not dependent upon three line wires and three switches being used, but that any number of switches and line wires or mains may be employed and different combinations of the same may be made, two at a time, to control any electrical device connected with the different receiving units. By the first system the number of wires leading from the receiving units to the lamps will be 2N, that is, each receiving unit will control a set of N—1 lamps by two wires. In the second method shown by the modification there must be a separate wire leading from each lamp to the receiving unit, and an additional contact point is required for each wire.

The switches $S_1$, $S_2$, $S_3$, etc. need not all be located at one and the same controlling point; but a plurality may be arranged at different controlling points so long as they are located at points along the mains to control their respective mains. For instance, switches in sets of two or more connected to the mains may be located in different rooms and the mains extend to a central point to control communication signals or the like.

Having fully described my invention, what I claim as new and desire to secure by Letters Patent of the United States, is—

1. A system of electrical control, comprising a plurality of receiving units, a series of contacts at each receiving unit, electro-magnetic devices at the receiving units controlling said contacts, the circuit of which electro-magnetic devices is normally completed at said contacts, and a plurality of electrical devices common to each receiving unit.

2. In a system of electrical control, a plurality of switches, each controlling a circuit, a plurality of groups of electrical devices, each group corresponding to one of said circuits, means controlled by closing one of said switches to bring any individual member of a corresponding group of electrical devices within the control of one of the other switches.

3. A system of electrical control, comprising a source of electrical energy, a plurality of mains or line wires extending from a controlling point, each main or line wire leading to a receiving unit, a return wire common to said receiving units, a plurality of electrical devices corresponding to each receiving unit, a switch for connecting each main or line wire to the source of electrical energy, an electro-magnetic device at each receiving unit, normally in electrical connection with its main and the return wire, for governing the circuit of said electrical devices, and means controlled by said electro-magnetic devices for shifting the connection of a plurality of said mains from the receiving units to the individual electric devices of a group, whereby the circuit of any one of said plurality of electrical devices may be controlled by closing a plurality of said switches.

4. A system of electrical control, comprising a source of energy, a plurality of mains extending therefrom, each leading to a receiving unit, a switch for each of said mains, a group of electrical devices to be controlled corresponding to each receiving unit, a return main common to said receiving units extending back to the source of energy, an electro-magnetic device at each of said receiving units, the circuit of which is normally completed at said receiving units, and means operated by each electro-magnetic device when energized by its main for closing the circuit or circuits leading to its group of electrical devices and breaking the circuit of the electro-magnetic devices of the other receiving units and closing at the other receiving units the circuit of the other mains to the electrical devices to be controlled.

5. In a system of electrical control, a plurality of mains leading from a source of electrical energy and provided with suitable means for opening and closing the circuit of said mains, each main leading to a receiving unit, a return main common to said receiving units, a group of electrical devices to be controlled corresponding to each receiving unit, a plurality of separate circuits leading from each group of electrical devices to separate contacts at the corresponding receiving unit, and an electro-magnetic device at each receiving unit coöperating with said contacts to independently govern any device of a group.

In testimony whereof, I have hereunto set my hand and affixed my seal in the presence of the two subscribing witnesses.

WOLFGANG E. EBERT. [L. S.]

Witnesses:
A. C. FOWLER,
HAROLD R. SMALL.